(12) United States Patent
Kuno

(10) Patent No.: US 10,871,727 B2
(45) Date of Patent: Dec. 22, 2020

(54) IMAGE FORMING APPARATUS AND IMAGE FORMING METHOD

(71) Applicant: DGSHAPE CORPORATION, Hamamatsu (JP)

(72) Inventor: Tsutomu Kuno, Hamamatsu (JP)

(73) Assignee: DGSHAPE CORPORATION, Hamamatsu (JP)

( * ) Notice: Subject to any disclaimer, the term of this patent is extended or adjusted under 35 U.S.C. 154(b) by 0 days.

(21) Appl. No.: 16/700,980

(22) Filed: Dec. 2, 2019

(65) Prior Publication Data
US 2020/0183298 A1    Jun. 11, 2020

(30) Foreign Application Priority Data
Dec. 6, 2018 (JP) ................................. 2018-228978

(51) Int. Cl.
*G03G 15/00* (2006.01)
*G03G 15/043* (2006.01)

(52) U.S. Cl.
CPC ................. *G03G 15/043* (2013.01)

(58) Field of Classification Search
CPC ........ G03G 15/00; G03G 15/043; G03F 7/00; G03F 7/20; B41J 2/435; B23K 26/0006; B23K 26/032; B23K 26/053; B23K 26/6483; B23K 26/705

USPC ................... 399/1–4, 51, 118, 177, 196–201
See application file for complete search history.

(56) References Cited

U.S. PATENT DOCUMENTS

| | | | | |
|---|---|---|---|---|
| 8,101,334 B2 * | 1/2012 | Ishimi | ...................... | B41J 2/442 347/225 |
| 8,133,652 B2 * | 3/2012 | Kawahara | ................ | B41J 2/442 347/225 |
| 9,724,783 B2 * | 8/2017 | Odagiri | .............. | B23K 26/0622 |

FOREIGN PATENT DOCUMENTS

JP        2004-001043 A        1/2004

\* cited by examiner

*Primary Examiner* — Hoan H Tran
(74) *Attorney, Agent, or Firm* — Knobbe, Martens, Olson & Bear, LLP

(57) ABSTRACT

An image forming apparatus includes an oscillator configured to oscillate a laser beam, an irradiation portion configured to radiate the laser beam oscillated by the oscillator to an outside, a light absorption unit configured to absorb the laser beam and to convert the laser beam to heat, and a control unit including at least one processor and at least one memory. The control unit is configured to control the irradiation portion to press the irradiation portion against a workpiece via the light absorption unit and irradiating the workpiece with the laser beam via the light absorption unit, so as to perform image forming processing.

11 Claims, 7 Drawing Sheets

IMAGE FORMING APPARATUS AND IMAGE FORMING METHOD

CROSS REFERENCE TO RELATED APPLICATION

This application claims priority to Japanese Patent Application No. 2018-228978 filed on Dec. 6, 2018, the entire contents of which are incorporated herein by reference.

BACKGROUND OF THE INVENTION

1. Field of the Invention

The present invention relates to an image forming apparatus and an image forming method.

2. Description of Related Art

A related art image forming apparatus or an image forming method irradiating a workpiece with a laser beam and forming an image on a surface of the workpiece (see, for example, JP2004-001043A).

When an image is formed using the image forming method or the image forming apparatus, there is concern that the formed image may be unclear due to unevenness of the surface of the workpiece, a change in material, or the like.

SUMMARY

One or more embodiments of the present invention provide an image forming method or an image forming apparatus capable of forming a distinct image.

In an aspect (1), one or more embodiments of the present invention provide an image forming apparatus, the image forming apparatus includes an oscillator configured to oscillate a laser beam, an irradiation portion configured to radiate the laser beam oscillated by the oscillator to an outside, a light absorption unit configured to absorb the laser beam and to convert the laser beam to heat, and a control unit including at least one processor and at least one memory. The control unit is configured to control the irradiation portion to press the irradiation portion against a workpiece via the light absorption unit and irradiate the workpiece with the laser beam via the light absorption unit, so as to perform image forming processing.

In an aspect (2), one or more embodiments provide an image forming method, the image forming method includes pressing an irradiation portion configured to radiate a laser beam against a workpiece via a light absorption unit configured to absorb the laser beam and to convert the laser beam to heat, and irradiating the workpiece with the laser beam via the light absorption unit.

DETAILED DESCRIPTION

Figure 1:
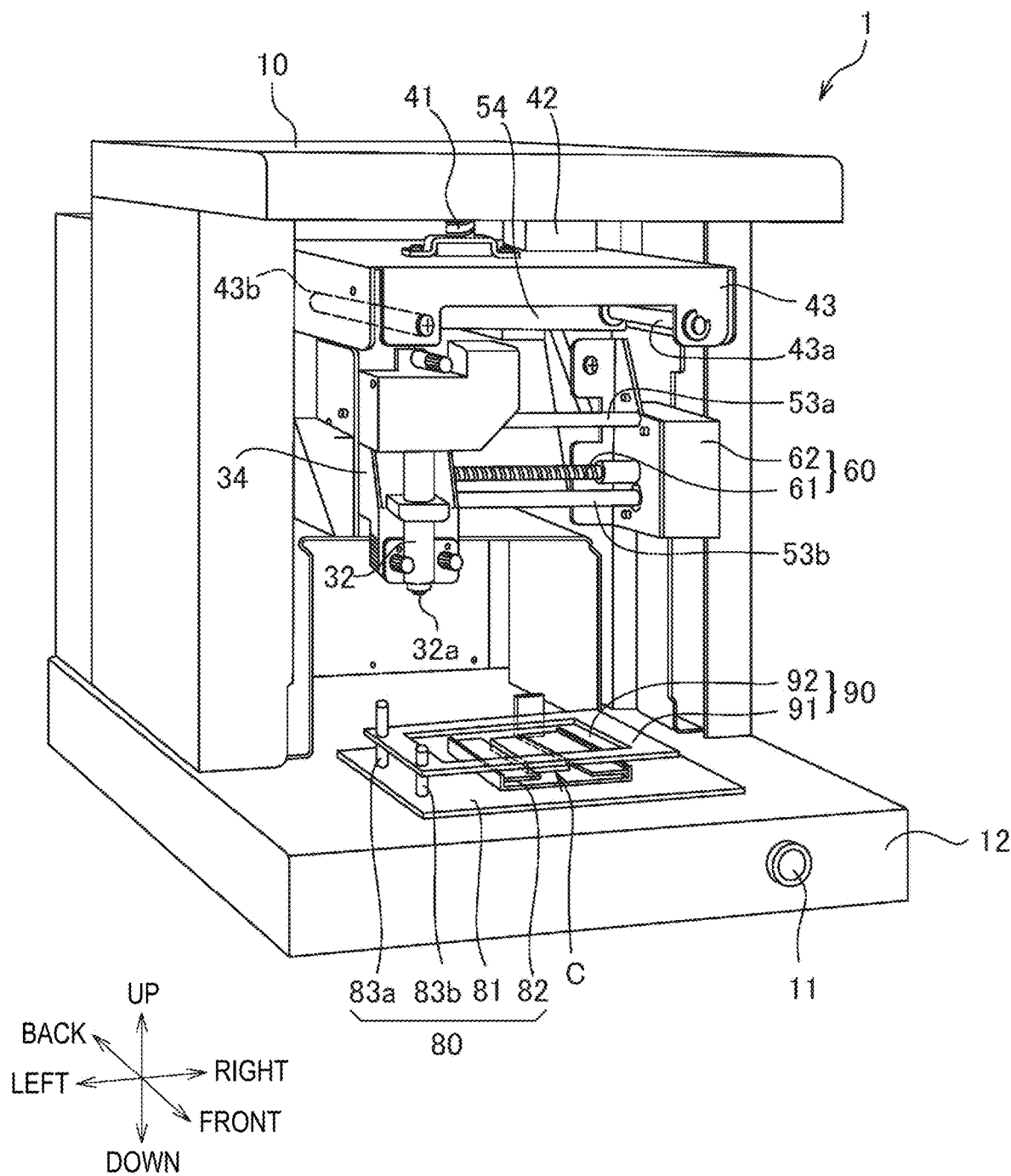
FIG. 1 is an external perspective view showing an image forming apparatus according to an embodiment.

An image forming apparatus 1 according to an embodiment of the present invention will be described with reference to FIG. 1 to FIG. 7. The image forming apparatus 1 according to the present embodiment causes a laser beam to scan a workpiece C to form an image on the workpiece C. As shown in FIG. 1 to FIG. 4, the image forming apparatus 1 includes a case 10, a control unit 20, an image forming unit 30, an up-down direction drive mechanism 40, a front-back direction drive mechanism 50, a left-right direction drive mechanism 60, an installation unit 80, and a light absorption unit 90. The image forming apparatus 1 is communicably connected to an external computer 2. The image forming apparatus 1 itself may have a function of the computer 2.

The computer 2 creates data of a scanning path along a shape of a predetermined pattern (for example, a contour of a character) and transmits the data to the image forming apparatus 1. As the computer 2, for example, a general personal computer can be used. The scanning path is created by using a predetermined program installed in the computer 2 in advance.

[Case]

Figure 2:
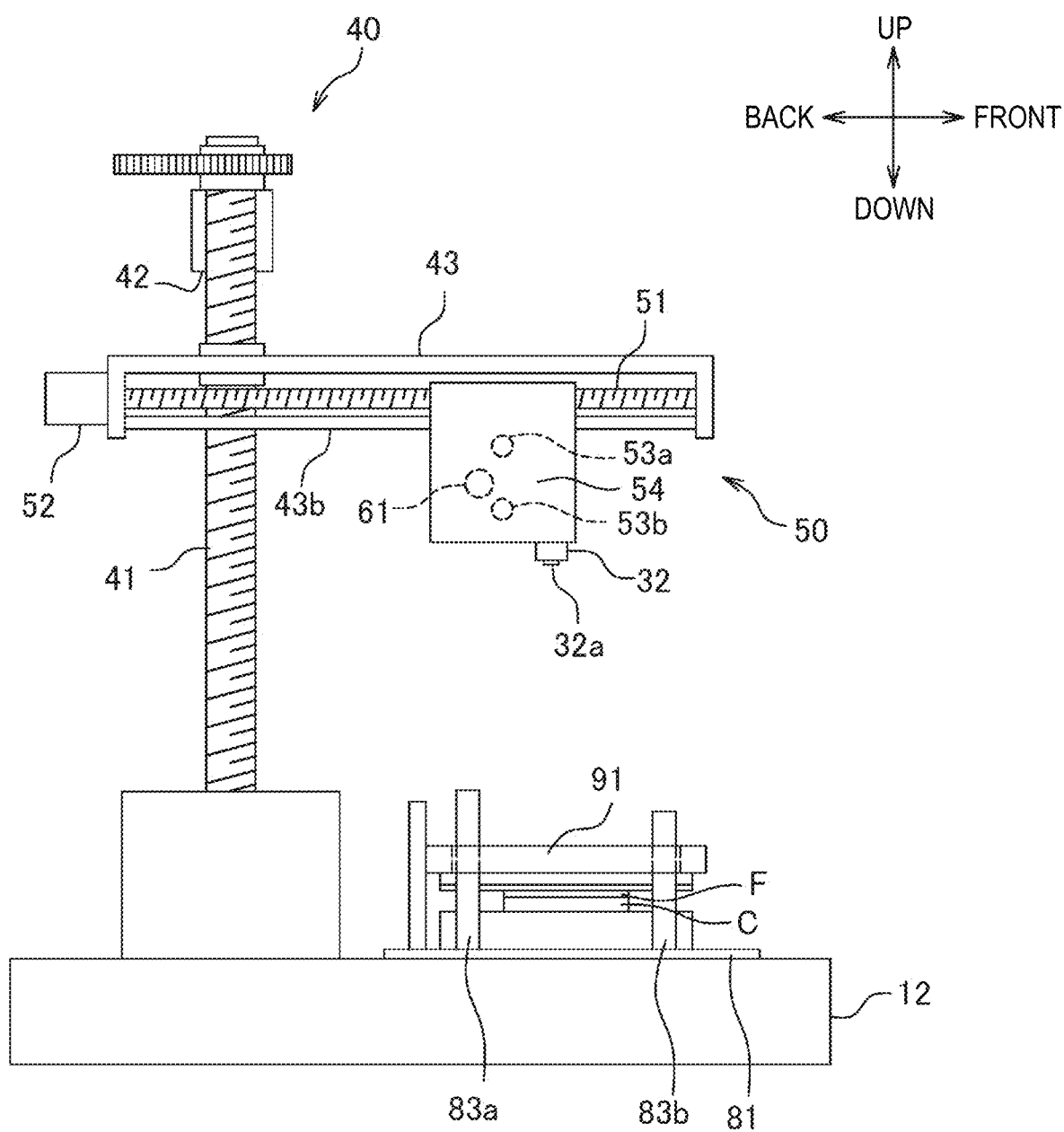
FIG. 2 is a left side view schematically showing a drive mechanism according to the embodiment.

As shown in FIG. 1 and FIG. 2, the case 10 includes a base portion 12. The base portion 12 is provided with a power switch 11 electrically connected to the control unit 20. The installation unit 80 is fixed to an upper surface of the base portion 12.

In the present embodiment, as shown in FIG. 1, directions of front, back, left and right, and up and down directions are defined. Specifically, a direction in which the power switch 11 is provided with respect to the case 10 is set as the front, and an opposite direction thereof is set as the back. In addition, the directions of left and right are defined with reference to a case in which the case 10 is viewed from the front. In the case 10, a side where the base portion 12 is disposed is set as a down side, and an opposite side thereof is set as an up side.

[Image Forming Unit]

As shown in FIG. 1 to FIG. 4, the image forming unit 30 is provided in the case 10. The image forming unit 30 includes a laser oscillator 31, an irradiation portion 32, an optical fiber 33, and a carriage 34.

Figure 3:
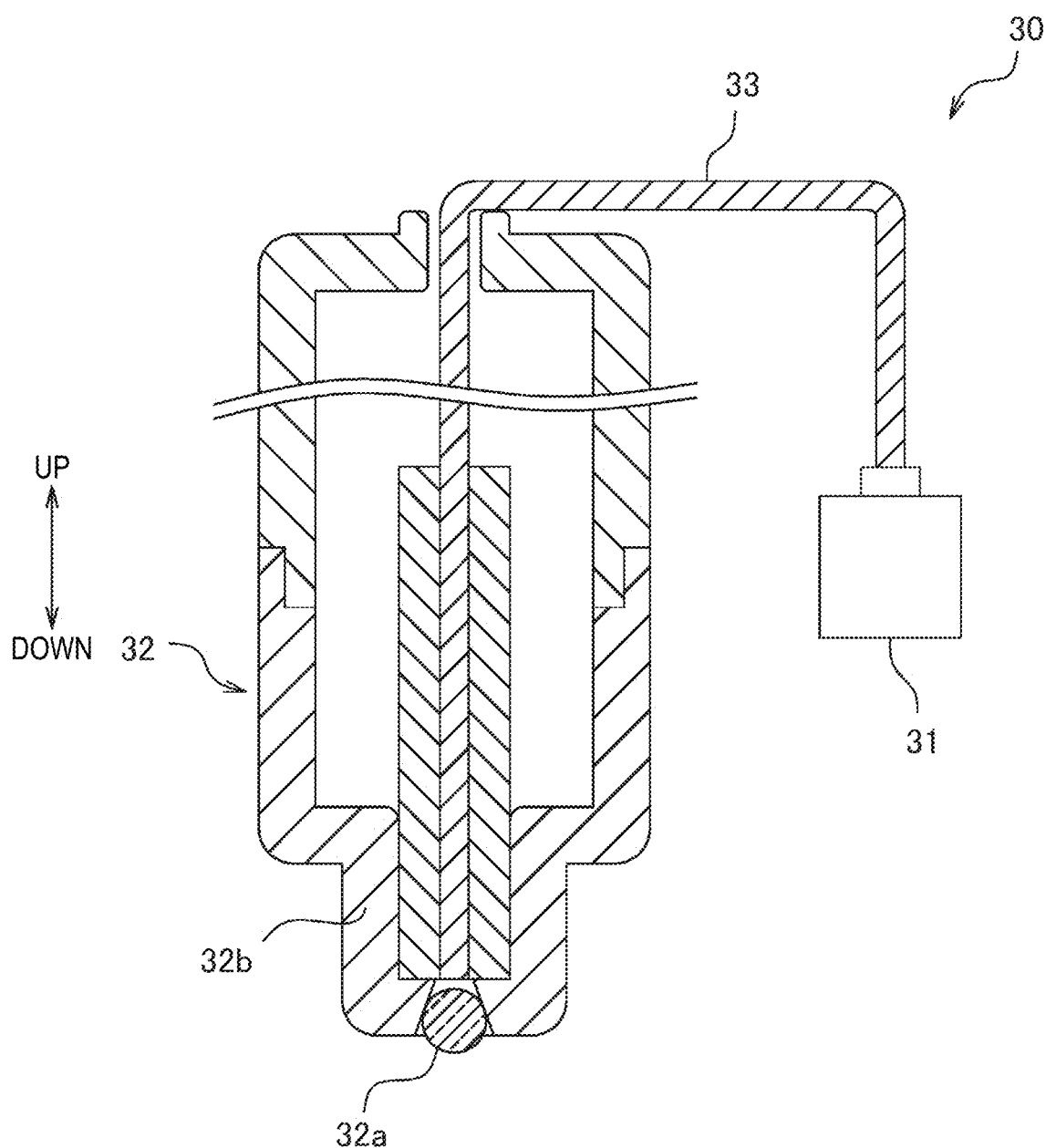
FIG. 3 schematically shows a part of an image forming unit except a carriage according to the embodiment.

The laser oscillator 31 is a semiconductor laser oscillator (FIG. 3). Since a predetermined current flows to the laser oscillator 31, a laser beam is oscillated from the laser oscillator 31. Performance of the laser oscillator 31 is, for example, 450 nm in wavelength and 1 W at the maximum output. The laser oscillator 31 is not limited to a semiconductor laser, and may be a solid laser or a gas laser such as a carbon dioxide laser.

As shown in FIG. 3, the irradiation portion 32 is connected via the laser oscillator 31 and the optical fiber 33. The irradiation portion 32 includes a lens 32a and a substantially cylindrical member 32b that supports the lens 32a at a lower portion and extends up and down.

In the present embodiment, the lens 32a is formed in a spherical shape and is formed of a material through which a laser beam is transmitted. The lens 32a is not limited to a spherical shape, and may be a lens shape or a hemispherical shape. The laser beam oscillated from the laser oscillator 31 is transmitted to the irradiation portion 32 via the optical fiber 33 and is radiated to the outside via the lens 32a. Image formation is performed by pressing the lens 32a against the workpiece C via the light absorption unit 90 and irradiating the workpiece C with a laser beam.

As shown in FIG. 1, the carriage 34 supports the irradiation portion 32 at a front portion of the carriage 34. The carriage 34 is supported to be drivable by the left-right direction drive mechanism 60, the front-back direction drive mechanism 50, and the up-down direction drive mechanism 40. By these drive mechanisms, the carriage 34 and the irradiation portion 32 supported by the carriage 34 can move relatively to the workpiece C in a three-dimensional direction, that is, can scan the workpiece C.

[Up-Down Direction Drive Mechanism]

As shown in FIG. 1 and FIG. 2, the up-down direction drive mechanism 40 includes an up-down direction drive shaft 41, a drive motor 42, and an elevation base 43. The up-down direction drive shaft 41 extends in the up-down direction, and is threaded in a spiral shape. An upper portion of the up-down direction drive shaft 41 is rotatably supported by the case 10, and a lower end portion thereof is rotatably supported by the base portion 12. The drive motor 42 is fixed to an upper portion of the case 10 and is electrically connected with the control unit 20. An output shaft of the drive motor 42 mechanically connects with the up-down direction drive shaft 41, and the up-down direction drive shaft 41 can be rotationally driven.

The elevation base 43 is a member extending in a horizontal direction, and is rotatably supported by a vertically extending slide shaft (not shown). The elevation base 43 is screwed with the up-down direction drive shaft 41. The elevation base 43 moves in the up-down direction since the up-down direction drive shaft 41 rotates. The elevation base 43 includes slide shafts 43a and 43b extending in the front-back direction.

[Front-Back Direction Drive Mechanism]

The front-back direction drive mechanism 50 includes a front-back direction drive shaft 51, a drive motor 52, and a slide base 54. The front-back direction drive shaft 51 is provided on the elevation base 43 so as to extend in the front-back direction, and is threaded in a spiral shape. The drive motor 52 is fixed to a back portion of the elevation base 43 and is electrically connected to the control unit 20. An output shaft of the drive motor 52 is connected with a back end portion of the front-back direction drive shaft 51, and can rotationally drive the front-back direction drive shaft 51.

The slide base 54 is screwed with the front-back direction drive shaft 51. The slide base 54 is rotatably supported by the slide shafts 43a and 43b. When the drive motor 52 is driven, the slide base 54 moves in the front-back direction by rotation of the front-back direction drive shaft 51. The slide base 54 includes slide shafts 53a and 53b extending in the left-right direction.

[Left-Right Direction Drive Mechanism]

The left-right direction drive mechanism 60 is coupled with the slide base 54. The left-right direction drive mechanism 60 includes a left-right direction drive shaft 61 and a drive motor 62. The left-right direction drive shaft 61 extends in the left-right direction, and is threaded in a spiral shape. An output shaft of the drive motor 62 mechanically connects with a right end portion of the left-right direction drive shaft 61, and the left-right direction drive shaft 61 can be rotationally driven. The drive motor 62 is electrically connected with the control unit 20.

The left-right direction drive shaft 61 is screwed to the carriage 34. The slide shafts 53a and 53b rotatably support the carriage 34. When the drive motor 62 is driven, the left-right direction drive shaft 61 rotates, and the carriage 34 is driven in the left-right direction along the slide shafts 53a and 53b.

[Installation Unit]

As shown in FIG. 1 and FIG. 2, the installation unit 80 includes a flat plate-shaped pedestal 81 fixed on the base portion 12, a fixture 82 detachably fixed on the pedestal 81, and support bodies 83a and 83b. The fixture 82 according to the present embodiment includes a pair of left and right members, and can sandwich the workpiece C. The fixture 82 has a function of fixing the workpiece C on the base portion 12 by sandwiching the workpiece C from the left and right.

The support bodies 83a and 83b are substantially cylindrical members whose lower end portions are fixed to the pedestal 81 and extend upward. An upper portion of the support 83a rotatably supports the light absorption unit 90.

[Light Absorption Unit]

The light absorption unit 90 includes a frame body 91 and a transparent or translucent film 92. The frame body 91 is a rectangular frame-shaped member in a top view, and supports the film 92. The film 92 has a function of absorbing a beam such as a laser beam and converting the beam to heat.

Figure 5A:
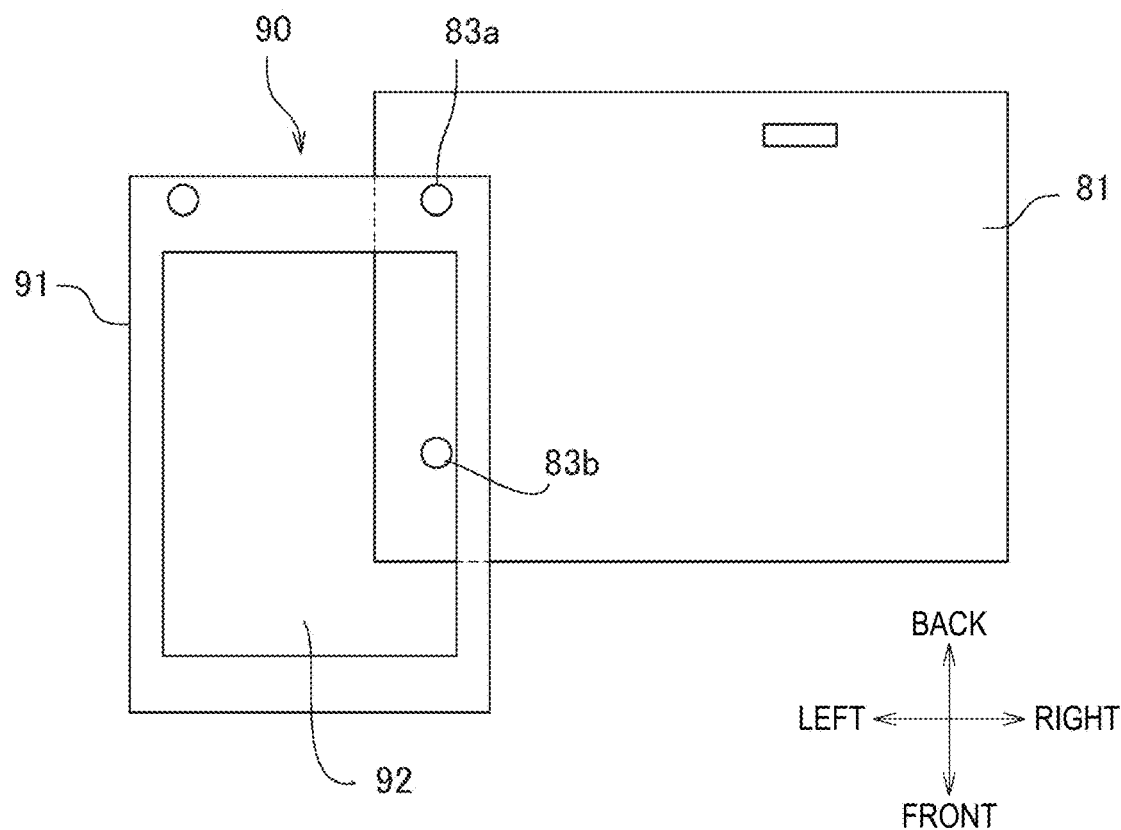
FIG. 5A is a top view showing a light absorption unit disposed at a preparation position and an installation unit according to the embodiment.
Figure 5B:
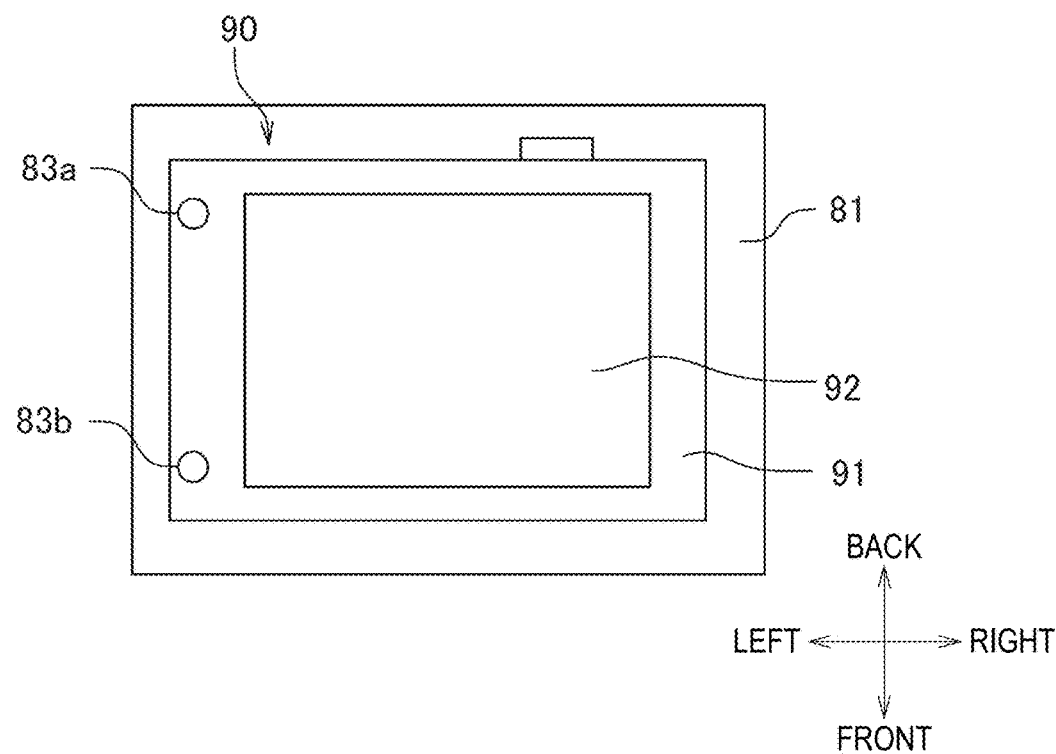
FIG. 5B is a top view showing the light absorption unit disposed at an installation position and the installation unit according to the embodiment. In order to facilitate understanding, illustration of a fixture is omitted.

As shown in FIG. 5, the light absorption unit 90 is rotatably supported by the support body 83a, and can rotate to substantially horizontal between a preparation position (FIG. 5A) and an installation position (FIG. 5B). When the light absorption unit 90 is disposed at the installation position, the frame body 91 engages with the support body 83b, so that the light absorption unit 90 is fixed to the installation position.

[Workpiece]

A surface of the workpiece C is formed of a material having a property of discoloring by heating. Therefore, when an image is formed on the workpiece C, it is possible to adjust image density by adjusting an amount of energy, that is, an amount of heat supplied to the workpiece C. Examples of the surface material of the workpiece C include leather such as case leather.

[Control Unit]

An overall operation of the image forming apparatus 1 is controlled by the control unit 20. A configuration of the control unit 20 is not particularly limited, but mainly includes a ROM that stores a program, a CPU that performs a program, a RAM that provides a work area in processing by the CPU, and an NVRAM that is a nonvolatile memory and stores various data in the present embodiment.

Figure 4:
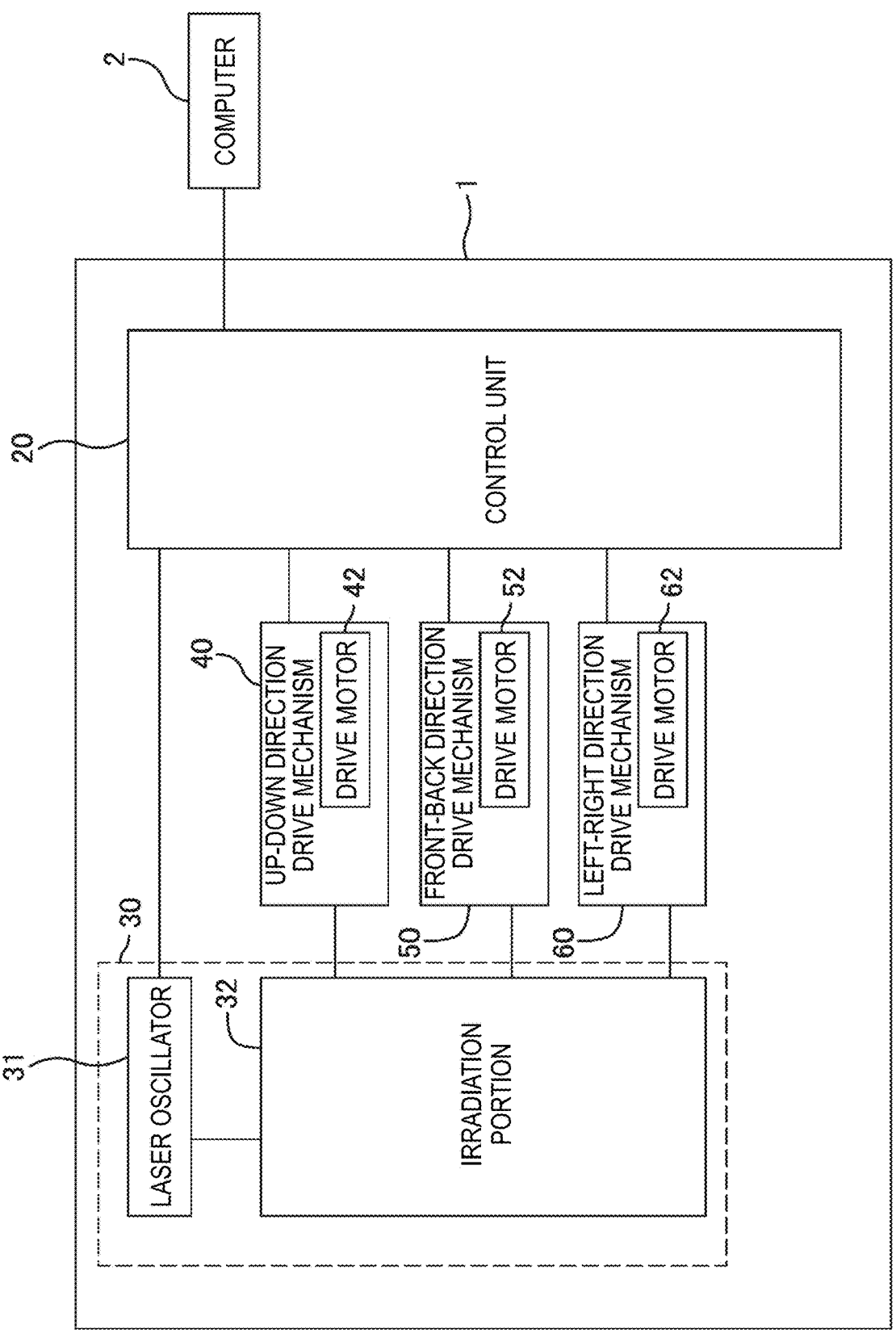
FIG. 4 is a block diagram showing a functional connection of the image forming apparatus according to the embodiment.

As shown in FIG. 4, the control unit 20 has a function of electrically connecting and controlling the laser oscillator 31 of the image forming unit 30. Further, the control unit 20 is communicably connected to the up-down direction drive mechanism 40, the front-back direction drive mechanism 50, and the left-right direction drive mechanism 60 and controls them. By controlling these drive mechanisms, the control unit 20 can control a scanning direction, a scanning path, and the number of scanning of the image forming unit 30, and can form an image on the workpiece C.

There are two kinds of methods for forming an image. One is image formation by intensity control, and the other is image formation by scanning control.

In the intensity control, the control unit 20 controls the laser oscillator 31 based on a density of pixels forming an image, and adjusts an intensity of the laser beam. Specifically, the control unit 20 analyzes the density of pixels for each pixel, and sets an amount of energy to be supplied to each pixel based on the analysis result. The control unit 20 controls a pulse width per hour of an applied voltage to be supplied to the laser oscillator 31. The control unit 20 controls laser oscillation time per unit time of the laser oscillator 31 by performing pulse width control, and causes a laser beam having an energy amount set for each pixel to emit light. Thus, the control unit 20 controls a time ratio of laser irradiation in the irradiation portion 32, and controls such that the intensity, that is, the energy amount of the laser beam corresponds to the density of pixels. The intensity of the laser beam or tones of the pixel density can be arbitrarily set according to conditions such as 256 tones and 512 tones.

In the scanning control, the control unit 20 adjusts the amount of energy to be supplied to each pixel by controlling the number of scans of the irradiation portion 32 with respect to the workpiece C. Specifically, the control unit 20 calculates the number of scans of the irradiation portion 32 based on the analysis result of the pixel density. The control unit 20 adjusts a density of the formed image by changing the number of scans for each pixel while radiating a laser beam of a constant intensity from the irradiation portion 32.

The image formation by scanning control is preferably applied to a case where a density of pixels arranged in a scanning direction is constant. For example, scanning control is preferably applied to a case of an image formed only by a character or a figure. On the other hand, since it is possible to form an image depending on each pixel density, the image formation by intensity control can be easily applied to an image such as a picture or a photograph.

When the image is formed by scanning control, an image of a plurality of pixels can be formed in a state in which constant output is maintained, so that rapid processing is possible. On the other hand, since the image formation by intensity control can correspond to a case where the density of pixels is uneven, it is possible to form a high-definition image.

[Image Forming Processing]

Figure 7:
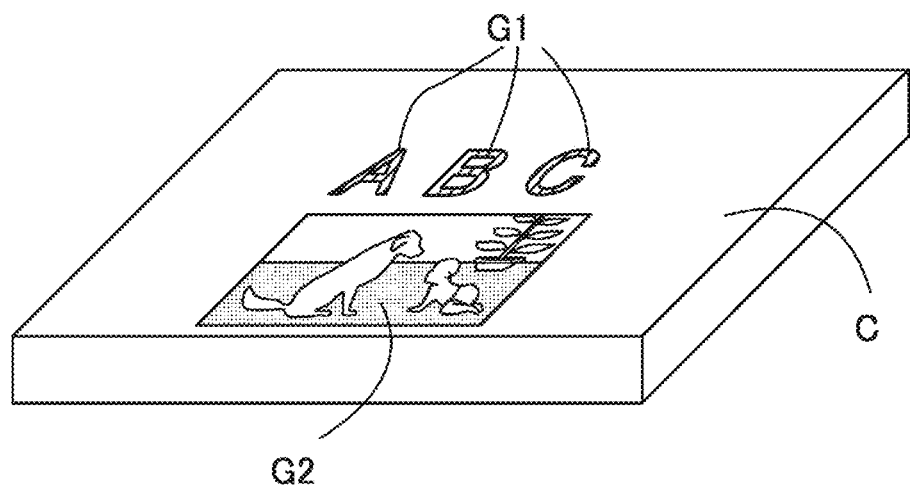
FIG. 7 schematically shows the image forming processing according to the embodiment.

Processing of forming an image on the workpiece C by using the image forming apparatus 1 will be described in detail below. In order to facilitate understanding, as shown in FIG. 7, processing of forming an image G1 and an image G2 in order on the workpiece C is described as a specific example of the image forming processing. The image G1 is composed of characters, and the image G2 includes photographs or pictures.

In the image forming processing, a user first disposes the light absorption unit 90 in the preparation position (FIG. 5A). Next, the user fixes the workpiece C so as not to move relatively to the base portion 12 by sandwiching the workpiece C by the fixture 82. Further, the user rotates the light absorption unit 90 from the preparation position to the installation position (FIG. 5B), and completes installation of the workpiece C. When the installation of the workpiece C is completed, the user inputs the image G1 and G2 to be formed and instructs start of processing of the control unit 20 by using the computer 2.

When instructing start of the processing, the computer 2 transmits information relating to image types of the images G1 and G2 in addition to image data of the images G1 and G2 to the control unit 20. The images are classified into two types: a character or figure image and a photograph or picture image.

Figure 6:
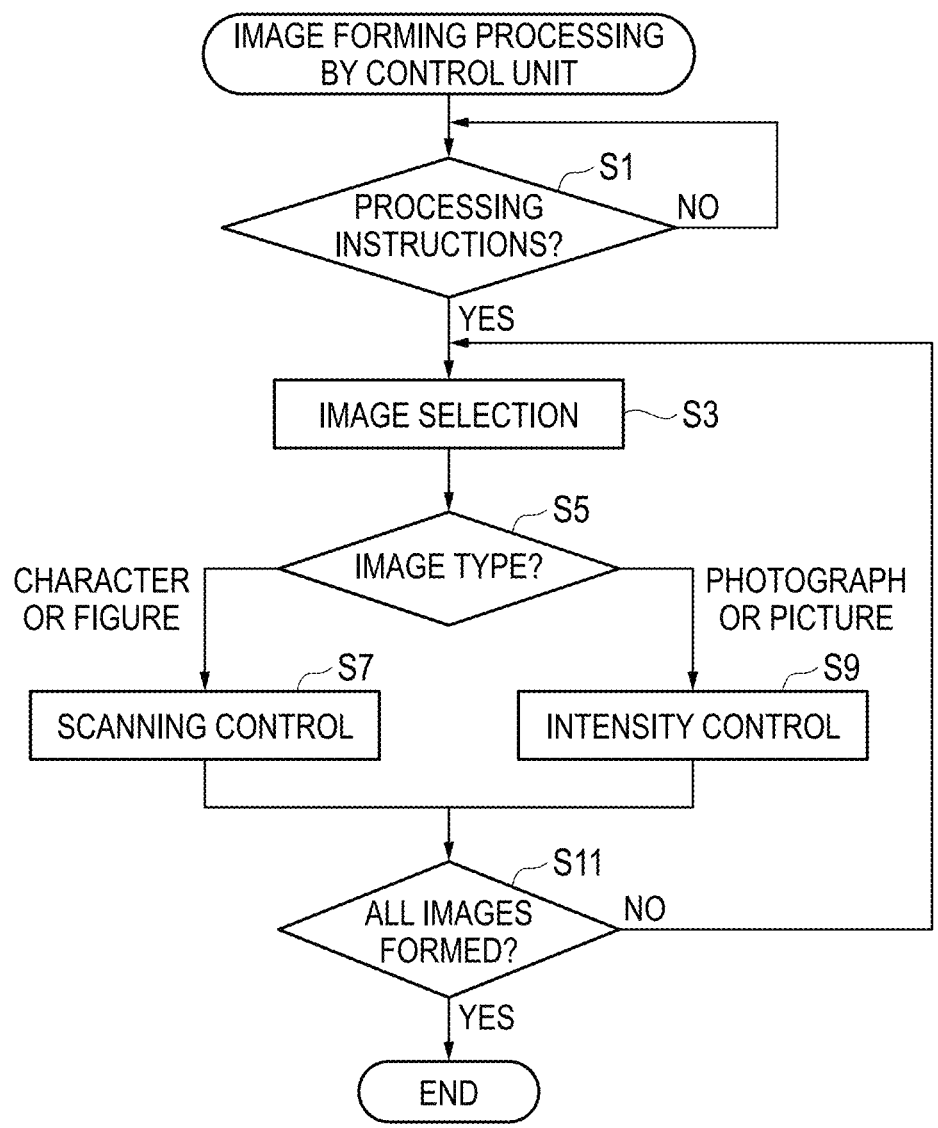
FIG. 6 is a flowchart showing image forming processing performed by a control unit according to the embodiment.

Upon receiving instructions from a user, the control unit 20 performs processing shown in FIG. 6. Operation of the control unit 20 may be performed by disposing an operation portion on the case 10 and using the operation portion.

The image forming processing executed by the control unit 20 will be described below with reference to FIG. 6. The control unit 20 stands by until there is processing instructions from the user (S1: NO), and the work is started when the instructions are received (S1: YES). The control unit 20 selects an image to be formed in step S3.

In step S5, the control unit 20 determines the image type based on information received from the computer 2. When the image selected in step S3 is the image G1, the control unit 20 determines the image type to be a character or figure image. When the image selected in step S3 is the image G2, the control unit 20 determines the image type to be a photograph or picture image.

When the image type is a character image (S3: character or figure), the control unit 20 propels the processing to step S7 to form an image by scanning control. In addition, when the image type is a photograph or picture image (S3: photograph or picture), the control unit 20 propels the processing to step S9 to form an image by intensity control.

In the image forming work, the control unit 20 activates the laser oscillator 31 and radiates a laser beam from the lens 32a of the irradiation portion 32. At this time, the lens 32a contacts the film 92, and is biased and pressed with force of 4.9 N or more toward the film 92 and the workpiece C by a biasing member or the up-down direction drive mechanism 40. The laser beam is radiated to the workpiece C through the film 92. A part of the workpiece C that has been irradiated with the laser beam is discolored by being heated, and an image is formed.

In the scanning control of step S7, the control unit 20 adjusts the density of pixels of the formed image by controlling the number of scans of the irradiation portion 32 as described above. In a case of the intensity control of the step S9, The control unit 20 adjusts the density of the formed image for each pixel by controlling the intensity of the laser beam to be radiated.

In step S11, the control unit 20 determines whether all images have been formed on the workpiece C. In a case where an image to be formed remains (S11: NO), the control unit 20 returns the processing to step S3, and the image to be formed is selected. When it is determined that all the images have been formed (S11: YES), the control unit 20 ends the image forming processing.

In the present embodiment, a configuration in which the laser oscillator 31 is used as a light generator for image formation has been described, but the present invention is not limited to such a configuration. For example, a light emitting diode can be used instead of the laser oscillator 31. In addition, not only the light emitting diode, but also an element or the like capable of changing output of light by changing a current to flow can be used.

In the above embodiment, the control unit 20 changes the control method at the time of forming the image G1 and the image G2, but the present invention is not limited to such an embodiment. For example, in step S3, it is also possible to determine the images G1 and G2 to be one photograph or picture, and to apply intensity control to the entire images G1 and G2 to form an image. The processing method may be determined with an image area regardless of contents of the image. For example, it is also possible to set an area of the image to be a predetermined area or larger so as to apply the intensity control.

The image type may be designated by the user or may be determined by the computer 2. Alternatively, the computer 2 may be configured to determine the image type by analyzing the image data by the control unit 20 without transmitting information of the image type.

In the present embodiment, an example in which only the irradiation portion 32 moves has been described, but the present invention is not limited to such a configuration. That is, the image may be formed since the installation unit 80 moves in the front-back direction, the left-right direction, and the up-down direction with respect to the fixed irradiation portion 32. In this case, the up-down direction drive mechanism 40, the front-back direction drive mechanism 50, and the left-right direction drive mechanism 60 have a configuration (for example, a drive motor for moving the installation unit 80 in the three axial directions) that drives the installation unit 80. Alternatively, both the irradiation portion 32 and the installation unit 80 may be moved.

A shape of the case of the workpiece in the present invention is not limited to a rectangular parallelepiped shape as in the present embodiment, and each side surface may be a curved surface.

The image forming apparatus 1 of the above embodiment includes the laser oscillator 31 that oscillates a laser beam, the irradiation portion 32 that can radiate the laser beam oscillated from the laser oscillator 31 to the outside, the light absorption unit 90 that absorbs the laser beam and converts it to heat, and the control unit 20, in which the control unit 20 presses the irradiation portion 32 against the workpiece C via the light absorption unit 90, an image is formed by irradiating the workpiece C with a laser beam through the light absorption portion 90.

In the above embodiment, an image forming method is adopted, in which the irradiation portion 32 is pressed against the workpiece C via the light absorption unit 90 that absorbs the laser beam and converts the laser beam to heat, and the workpiece C is irradiated with a laser beam via the light absorption unit 90.

According to the above configuration, since the laser beam is radiated while the irradiation portion 32 is pressed against the workpiece C, a distinct image can be formed without causing blurring, nonuniformity, or the like on the formed image. In the above configuration, absorptance of light on the workpiece C is made uniform by the light absorption unit 90, and heat supplied to the workpiece C can be homogenized. Therefore, even when the absorptance of the light on the surface of the workpiece C varies depending on the part, the unevenness of the image is reduced or prevented. In addition, since the workpiece C is not directly irradiated but is irradiated through the light absorption unit 90 with the laser beam, generation of fumes during image formation can be reduced or prevented.

In the image forming processing, the control unit 20 can execute at least one of intensity control processing for controlling the intensity of the laser beam radiated by the irradiation portion 32 depending on a density of an image to be formed and scanning control processing for controlling the number of times that the irradiation portion 32 scans the workpiece C depending on the density of the image.

According to the above configuration, two types of control methods of the intensity control processing and the scanning control processing can be used. Therefore, the control method can be appropriately selected according to the purpose.

The control unit 20 can further execute determination processing of determining the type of the image, and performs either one of the scanning control processing and the intensity control processing depending on the type.

According to the above configuration, the control unit 20 can determine the processing method depending on the type of the image. Therefore, it is not necessary for the user to determine the processing method, and scanning at the time of image formation is easy. Further, since suitable processing is adopted depending on the image, work efficiency or image quality can be improved.

In the above embodiment, the laser oscillator 31 includes a semiconductor laser oscillation device. Therefore, it is possible to make the laser oscillator 31 smaller and less power consumed compared with a carbon dioxide laser oscillator or the like.

The control unit 20 can press the irradiation portion 32 against the workpiece C with force of 4.9 N or more. Even in a case where the workpiece C is a soft material such as leather, it is possible to reduce an influence of unevenness or material change of the surface of the workpiece C during image formation by pressing with force of 4.9 N or more. Therefore, a distinct image can be formed.

The above embodiment has been presented as an example of the invention, and does not limit the scope of the invention. Various omissions, substitutions, and changes can be made to the above configuration without departing from the spirit of the invention. The above embodiment and the modification thereof are included in the invention described in the scope of claims and the equivalent scope thereof as well as included in the scope and spirit of the invention.

What is claimed is:

1. An image forming apparatus comprising:
    an oscillator configured to oscillate a laser beam;
    an irradiation portion configured to radiate the laser beam oscillated by the oscillator to an outside;
    a light absorption unit configured to absorb the laser beam and to convert the laser beam to heat; and
    a control unit including at least one processor and at least one memory,
    wherein the control unit is configured to control the irradiation portion to press the irradiation portion against a workpiece via the light absorption unit and irradiate the workpiece with the laser beam via the light absorption unit, so as to perform image forming processing.

2. The image forming apparatus according to claim 1, wherein the control unit is configured to perform, in the image forming processing, at least one of intensity control processing for controlling an intensity of a laser beam radiated by the irradiation portion depending on a density of an image to be formed and scanning control processing for controlling a number of times that the irradiation portion scans the workpiece depending on the density of the image to be formed.

3. The image forming apparatus according to claim 2, wherein the control unit is configured to further perform determination processing for determining a type of the image, and
    wherein the control unit is configured to perform the intensity control processing or the scanning control processing, depending on the type.

4. The image forming apparatus according to claim 1, wherein the oscillator includes a semiconductor laser oscillation device.

5. The image forming apparatus according to claim 1, wherein the control unit is configured to control the irradiation portion to press the irradiation portion against the workpiece with a force which is equal to or greater than 4.9 N.

6. The image forming apparatus according to claim 1, wherein the control unit is configured to irradiate the workpiece while pressing the irradiation portion against the workpiece.

7. An image forming method comprising:
pressing an irradiation portion configured to radiate a laser beam against a workpiece via a light absorption unit configured to absorb the laser beam and to convert the laser beam to heat; and
irradiating the workpiece with the laser beam via the light absorption unit.

8. The image forming method according to claim 7, further comprising performing at least one of intensity controlling for controlling an intensity of the laser beam radiated by the irradiation portion depending on a density of an image to be formed and scanning controlling for controlling a number of times that the irradiation portion scans the workpiece depending on the density of the image to be formed.

9. The image forming method according to claim 8, further comprising determining a type of the image, and performing the intensity control processing or the scanning control processing, depending on the type.

10. The image forming method according to claim 7, wherein the pressing is pressing the irradiation portion against the workpiece with a force which is equal to or greater than 4.9 N.

11. The image forming method according to claim 7, wherein irradiating the workpiece is performed while pressing the irradiation portion against the workpiece.

* * * * *